No. 773,811. PATENTED NOV. 1, 1904.
E. H. ROLLINS.
SILK COMBING MACHINE.
APPLICATION FILED NOV. 14, 1903.
NO MODEL. 2 SHEETS—SHEET 1.
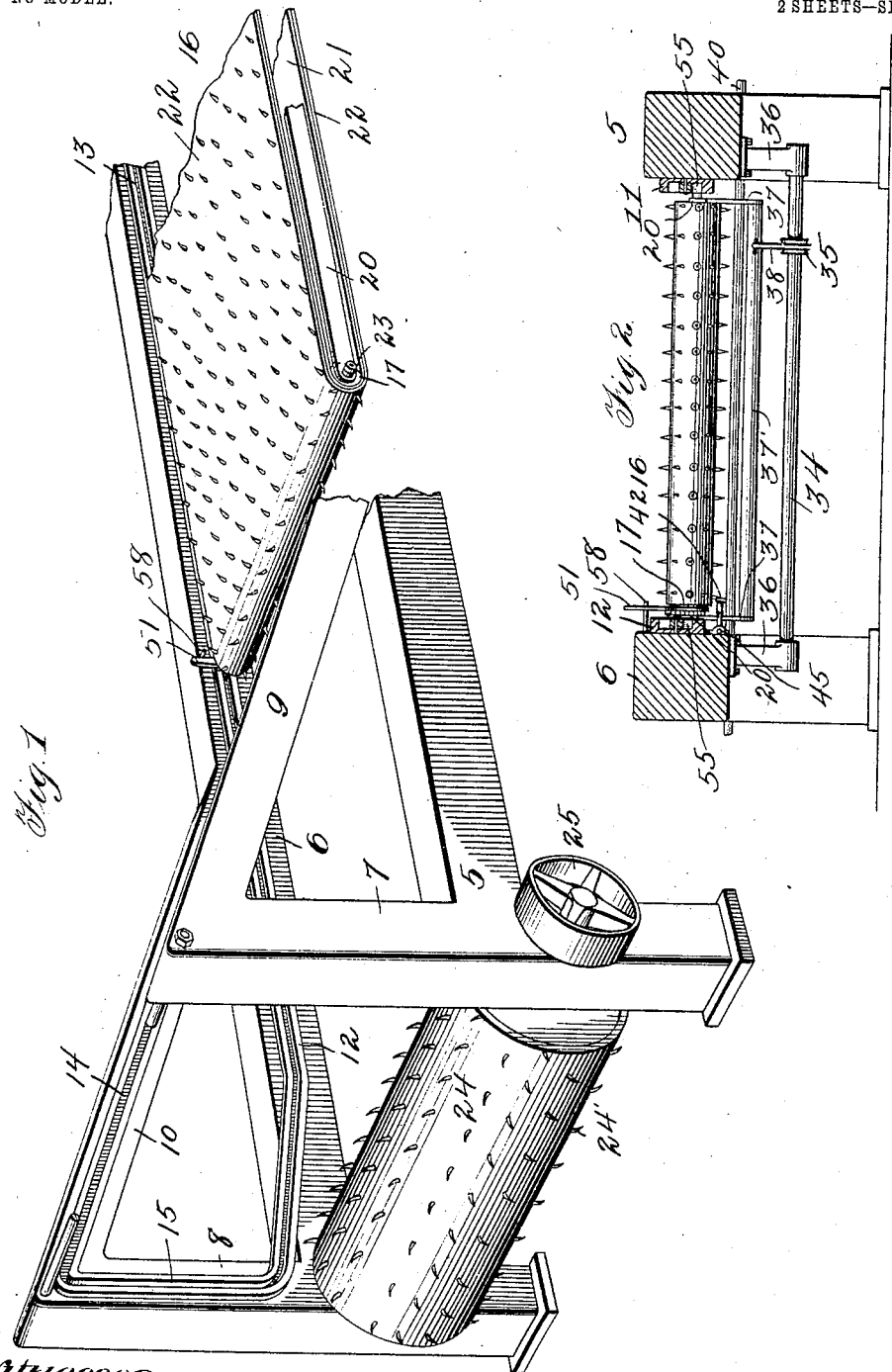
Witnesses:
Inventor:
Edward H. Rollins.
By his Attorney,
Frank J. Campbell.

No. 773,811. PATENTED NOV. 1, 1904.
E. H. ROLLINS.
SILK COMBING MACHINE.
APPLICATION FILED NOV. 14, 1903.
NO MODEL. 2 SHEETS—SHEET 2.
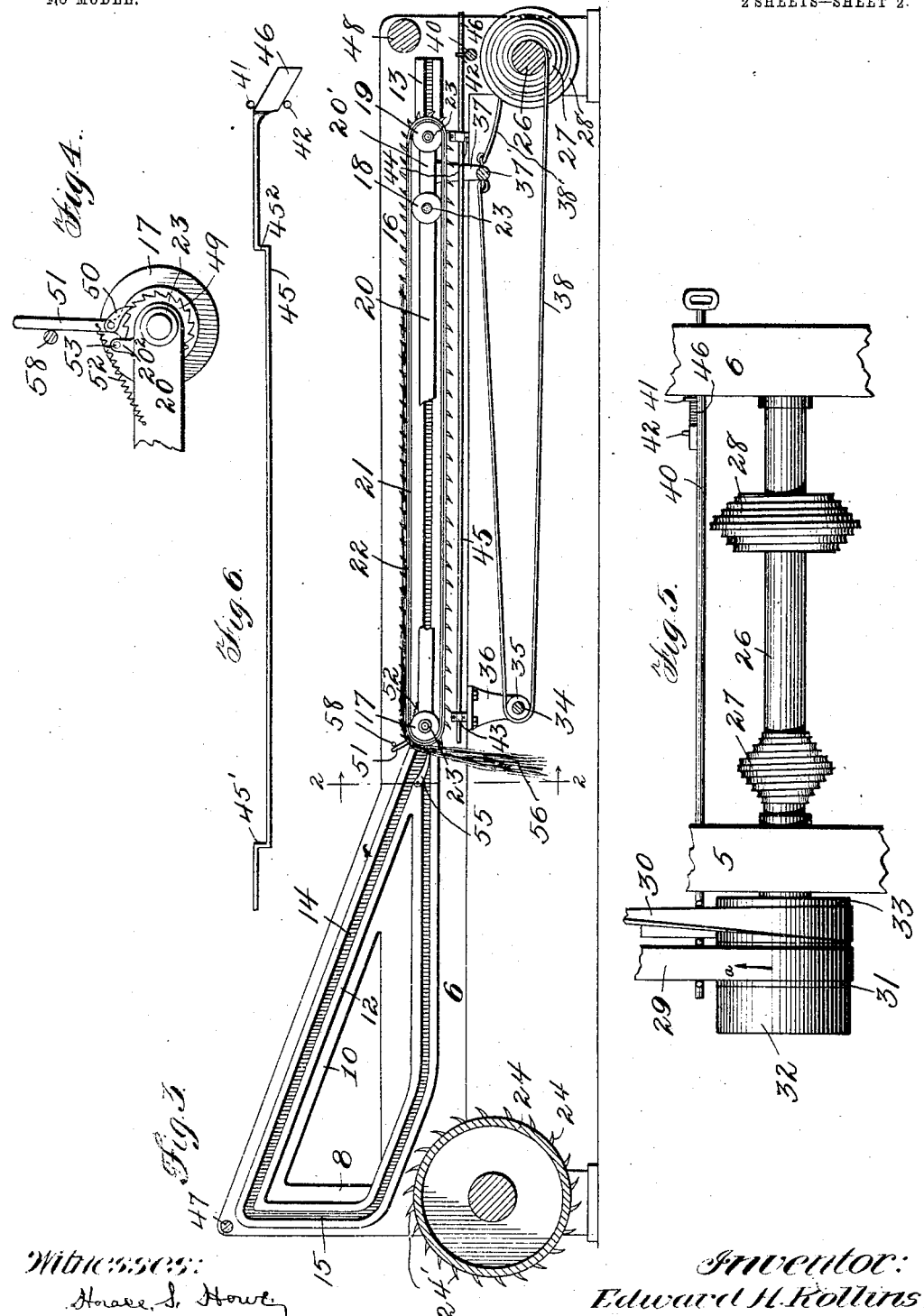
Witnesses: Inventor:
Edward H. Rollins,
By his Attorney
Frank J. Campbell.

No. 773,811. Patented November 1, 1904.

UNITED STATES PATENT OFFICE.

EDWARD H. ROLLINS, OF MANCHESTER, CONNECTICUT.

SILK-COMBING MACHINE.

SPECIFICATION forming part of Letters Patent No. 773,811, dated November 1, 1904.

Application filed November 14, 1903. Serial No. 181,114. (No model.)

*To all whom it may concern:*

Be it known that I, EDWARD H. ROLLINS, a citizen of the United States, residing at Manchester, in the county of Hartford and State of Connecticut, have invented certain new and useful Improvements in Silk-Combing Machines, of which the following is a specification.

My invention relates to silk-combing machines, and has for its object the provision of means for combing silk more rapidly than has heretofore been practicable.

A further object of the invention is the substitution of mechanical means for the performance of work which has heretofore been done by hand.

Further objects and advantages of the invention will be set forth in the detailed description which now follows.

In the accompanying drawings, Figure 1 is a perspective view of the machine looking toward the rear thereof with certain of the parts broken away. Fig. 2 is a transverse vertical section upon line 2 2 of Fig. 3 with the driving-shaft and its pulleys omitted looking in the direction of the arrow. Fig. 3 is a view of the machine with one of the side frames removed and with certain parts in section. Fig. 4 is an end view of one of the rollers comprising the carrier and of a feed mechanism for actuating the same. Fig. 5 is a view of a driving-shaft upon which are mounted conical grooved pulleys for a purpose hereinafter described, and Fig. 6 is a plan view of the belt-shifting device.

Like numerals designate similar parts throughout the views of the drawings.

In the accompanying drawings the numerals 5 and 6 designate the side frames of a silk-combing machine. Vertical extensions 7 and 8 and inclined braces 9 and 10 form supports for ways 11 and 12, which extend nearly the entire length of the machine. As is best illustrated in Fig. 3, said ways comprise a horizontal portion 13, an inclined portion 14, a vertical portion 15, and a portion leading from said vertical portion to said horizontal portion at such an angle that the silk will be drawn across teeth and effectually combed, as will be hereinafter described. Mounted for reciprocatory movement in the ways 11 and 12 is a carrier 16, comprising the rollers 17, 18, and 19, the side bars 20 20', the plain belt 21, and the toothed belt 22. Antifriction-rolls 23 upon the ends of rollers 17, 18, and 19 serve to reduce the friction of the parts. Mounted for rotation in the side frames 5 and 6 is a toothed cylinder 24, upon the shaft of which is a pulley 25, to which power may be transmitted by a belt.

For reciprocating the carrier 16 a shaft 26, carrying conical grooved pulleys 27 and 28, is mounted for rotation in frames 5 and 6. Said draft is driven by straight and cross belts 29 and 30, applied to the fast pulley 31 or running idly upon the loose pulleys 32 and 33, as will be hereinafter described. A shaft 34, carrying a grooved idler-roll 35, is mounted in hangers 36, secured to the frames 5 and 6. Arms 37, depending from the side bars 20' of the carrier, are connected by a rod 37', to which are secured the cables 38 and 38'. Cable 38' runs directly from said rod to the grooved conical pulley 28, to which it is secured, while cable 38 runs from the said rod over the idler-roll 35 and is then secured to pulley 27. Referring now to Figs. 3 and 6, it will be seen that means have been provided for automatically shifting the belts 29 and 30, to thereby impart a reciprocatory movement to carrier 16, as will be hereinafter described. These means comprise the rod 40, slidably mounted in the frames 5 and 6 and carrying the pins 41 and 42. This rod is provided with the usual forks for engaging the belts 29 and 30, as will be seen by referring to Fig. 5.

Secured to the frame 6 are brackets 43 and 44, in which is disposed a rod 45, having its bearing portions offset, as illustrated in Fig. 6. Carried by said rod and lying between the pins 41 and 42 is a cam 46. Tie-rods 47 and 48 add to the rigidity of the machine.

Fast upon the shaft of roller 17 is a ratchet-wheel 49, which is engaged by a pawl 50, carried by an arm 51, loosely mounted for oscillatory movement upon said shaft. A spring 52, one end of which is secured to side bar 20 carrier as it moves forward, and for causing said carrier to descend when the material to be combed overhangs the combing-cylinder.

9. In a combing-machine, the combination, with a combing-cylinder, of a toothed reciprocatory carrier, means for elevating one end of said carrier until the material to be combed overhangs said combing-cylinder and for causing said carrier to descend until said material is engaged by the combing-cylinder.

In testimony whereof I affix my signature in presence of two witnesses.

EDWARD H. ROLLINS.

Witnesses:
MAUDE T. PECK,
JOSIAH H. PECK.